(12) United States Patent
Talyansky (10) Patent No.: US 7,676,796 B2
(45) Date of Patent: Mar. 9, 2010

(54) DEVICE, SYSTEM AND METHOD FOR MAINTAINING A PRE-DEFINED NUMBER OF FREE REGISTERS WITHIN AN INSTRUMENTED PROGRAM

(75) Inventor: Roman Talyansky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1196 days.

(21) Appl. No.: 11/237,804

(22) Filed: Sep. 29, 2005

(65) Prior Publication Data

US 2007/0074193 A1 Mar. 29, 2007

(51) Int. Cl.
*G06F 9/44* (2006.01)

(52) U.S. Cl. .................... 717/130; 717/131

(58) Field of Classification Search ......... 717/127–128, 717/130–131
See application file for complete search history.

(56) References Cited

U.S. PATENT DOCUMENTS

| | | | |
|---|---|---|---|
| 5,553,267 A | 9/1996 | Herlihy | |
| 5,574,922 A | 11/1996 | James | |
| 6,154,877 A * | 11/2000 | Ramkumar et al. | 717/114 |
| 6,430,657 B1 | 8/2002 | Mittal et al. | |
| 6,438,740 B1 | 8/2002 | Broder et al. | |
| 6,470,493 B1 | 10/2002 | Smith et al. | |
| 6,481,008 B1 * | 11/2002 | Chaiken et al. | 717/158 |
| 6,950,923 B2 * | 9/2005 | O'Connor et al. | 712/202 |
| 7,137,105 B2 * | 11/2006 | Madsen et al. | 717/128 |
| 7,493,630 B2 * | 2/2009 | Hunt | 719/330 |
| 2001/0013119 A1 * | 8/2001 | Agarwal | 717/11 |
| 2004/0133777 A1 * | 7/2004 | Kiriansky et al. | 713/166 |
| 2008/0189687 A1 * | 8/2008 | Levine et al. | 717/128 |

OTHER PUBLICATIONS

Larus et al. "Rewriting Executable Files to Measure Program Behavior" Feb. 1994, John Wiley & Sons, Ltd., Softeare-Practice and Experience, vol. 24 (2) pp. 197-218.*
Shende et al. "Integrated Tool Capabilities for Performance Instrumentation and Measurement", 2003, ISPASS 2003, pp. 1-22.*
Computer Science Deparatment University of Tennessee, "Innovative Computing Laboratory 2002 Report", 2002, 32 p. 27.*
Stitt et al. "Dynamic Hardware/Software Partitioning: A First Approach", Jun. 2003, ACM, pp. 250-255.*
U.S. Appl. No. 10/673,261, filed Sep. 30, 2003, Talyansky, Roman et al.
Pin: Building Customized Program Analysis Tools with Dynamic Instrumentation Chi-Keung Luk Intel Corporation and University of Colorado Apr. 19, 2005.

(Continued)

*Primary Examiner*—Anna Deng
(74) *Attorney, Agent, or Firm*—Pearl Cohen Zedek Latzer, LLP (57) ABSTRACT

A method, device and system for maintaining a pre-defined number of free registers at any location of an instrumented program such that at each point during execution of a segment of the instrumented program, the segment has access to the pre-defined number of free registers.

9 Claims, 6 Drawing Sheets

OTHER PUBLICATIONS

Model Tool Coverage www.mathworks.com/access/helpdesk/help/toolbox/simulin.../performance_tool13.shtm, 3 pages Sep. 8, 2003.
"Software Development - Thread Checker About Instrumentation" Intel, printed prior to Sep. 29, 2005.
Sameer Shende, Allen Maloney, "Integrated Tool Capabilities for Performance Instrumentation and Measurement", pp. 1-14, printed prior to Sep. 29, 2005.
Release notes, Intel Thread Checker, printed prior to Sep. 29, 2005.

* cited by examiner

DEVICE, SYSTEM AND METHOD FOR MAINTAINING A PRE-DEFINED NUMBER OF FREE REGISTERS WITHIN AN INSTRUMENTED PROGRAM

BACKGROUND OF THE INVENTION

In binary instrumentation pieces or sections of binary code which may be called instrumentation fragments may be added to a compiled and linked program (also referred to herein as "binary image") at various points in the program. These binary fragments may for example collect information relating to the execution of the compiled program. For example, in the case of a coverage tool, instrumentation fragments may be added at or in various basic blocks to count the number of times each basic block is reached. Other functionality may be performed. Some instrumentation fragments rely on registers to temporarily store information generated by the fragment or by the binary image as it runs. In some tools, a register may be associated with each instrumentation fragment that is inserted into a compiled binary code. In processors relying on architectures that use a register stack, it may be necessary to spill the data in a busy register before a thread processes an instrumentation fragment. Data that was in a busy register may be restored once the instrumentation fragment or a thread is completed. To facilitate a spill of busy registers, it may be necessary to identify free registers that may be linked with or available to an instrumentation fragment. One free register may be required to facilitate such spilling in an instrumentation in some processors using a register stack. This requirement may limit the instrumentation locations where binary fragments may be inserted to those where one or more free registers are available.

BRIEF DESCRIPTION OF THE DRAWINGS

Embodiments of the invention will be understood and appreciated more fully from the following detailed description taken in conjunction with the drawings in which.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification, discussions utilizing terms such as "processing," "computing," "calculating," "determining," "altering" or the like, refer to the actions and/or processes of a processor, computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and displays presented herein are not inherently related to any particular computer, communication device or other apparatus. The desired structure for a variety of these systems will appear from the description below. In addition, embodiments of the present invention are not described with reference to any particular programming language, machine code, etc. It will be appreciated that a variety of programming languages, machine codes, etc. may be used to implement the teachings of the invention as described herein.

As used in this application the following terms may have the following meanings: 'Threadsafe' may mean for example measures or processes taken that ensure that different threads of a program do not interfere with each other. In some cases a threadsafe process may for example perform a read, increment and write-to-memory operation atomically so that a second process does not for example read the memory location between the point at which the first process reads the memory location and the point at which the first process writes the incremented value back to the memory location. Other operations or series of operations may be used to ensure that a process or instruction is threadsafe. 'Fetchadd' or 'Fetch and add' may mean or include a process that may perform increment, decrement or addition of a signed constant using an atomic read, increment and write to memory, such that the increment, decrement or constant addition is performed in a threadsafe manner. Other fetchadds may for example use semaphores or locks to ensure that an increment is performed in a threadsafe manner. Some fetchadd instructions, may for example retrieve, increment and store a value in a designated memory location for such value, and into a register or cache of a processor in an atomic fashion. Some fetchadd instructions may be performed when only a single free register is available to a processor. A 'free register' may mean a register that may hold a value that is not used or later called on in a program. A register that is not free may be said to be busy. A not accessed register may mean a register that is not in use within a particular segment of the program, e.g., not being read from or write to, the not accessed registers may have values that may be read after the execution leaves the region to another region. Thus these registers may not necessary be free within the region, where they are not accessed.

Figure 1A:
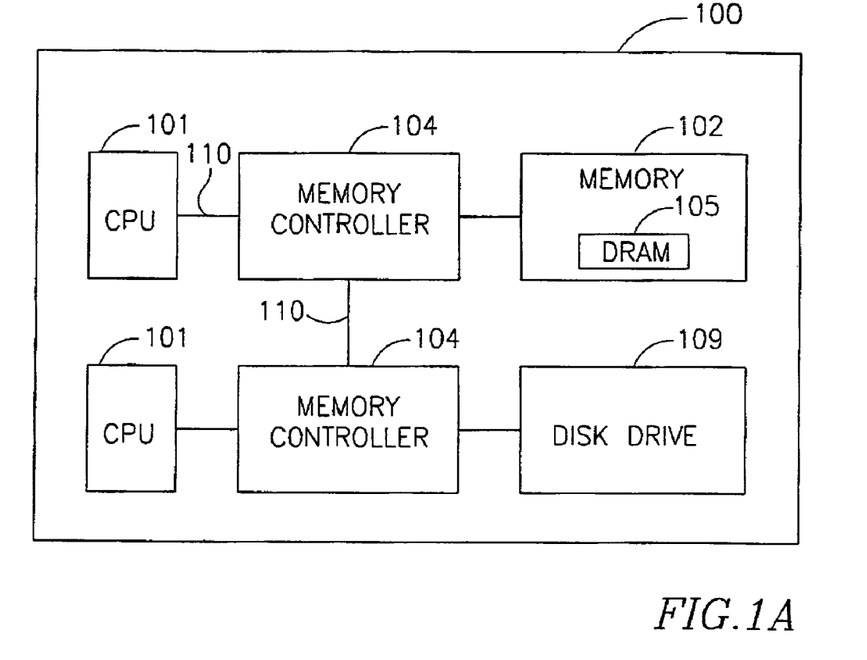
FIG. 1A is a schematic diagram of components of a computer in accordance with an embodiment of the invention.

Reference is made to FIG. 1A, a block diagram of components of a computer with a processor and a memory in accordance with an embodiment of the invention. Computer 100 may include one or more central processing units (CPU) 101 which may be connected to one or more memory controllers 104. A bus 110 may connect CPUs 101 with one or more memory controllers 104 or with other components of computer 100. In some embodiments of the invention, CPU 101 may be a processor, which relies on a register stack architecture. Any other suitable processor architecture may be used. Computer 100 may contain one or more data storage or memory 102 units. In some embodiments, memory 102 may be or include a dynamic random access memory storage unit 105; other suitable types of random access or other memory may be used. Memory controller 104 may be connected to other storage devices such as for example a disc drive 109.

Figure 1B:
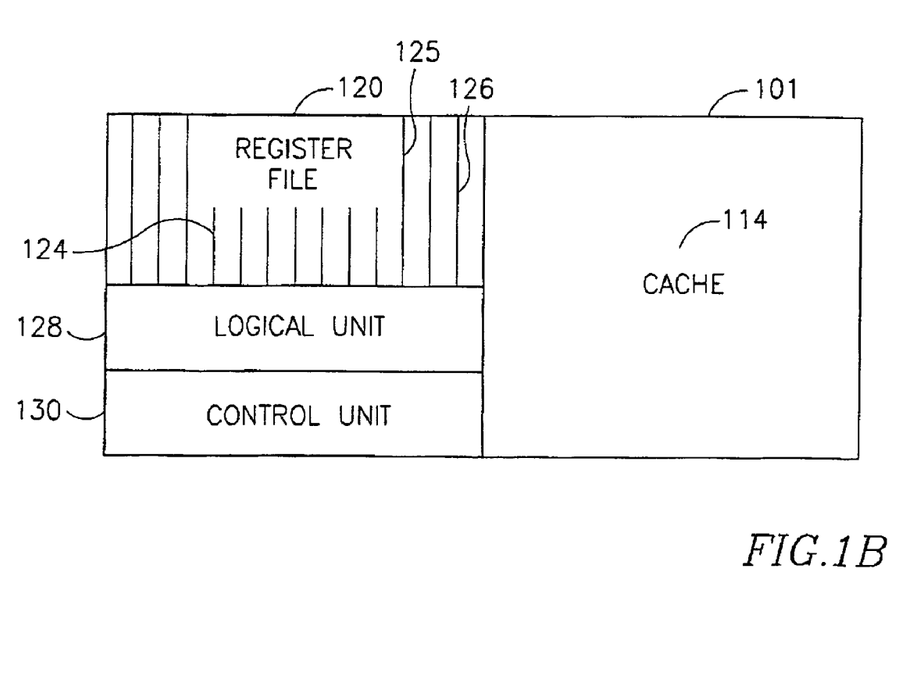
FIG. 1B is a schematic diagram of components of a central processing unit in accordance with an embodiment of the invention.

Reference is made to FIG. 1B, a block diagram of components of a CPU 101 as described in FIG. 1A. CPUs 101 may include a register file 120 that may be or include registers 124 that may in some embodiments be disposed on or proximate to a CPU 101. Some of registers 124 may for purposes of a particular execution of a program code or instrumentation fragment be busy registers 125, while others may be free registers 126. CPU 101 may include logical units 128 that may in some embodiments perform logic instructions such as for example increments, decrements or other mathematical computations. CPU 101 may include one or more caches 114 that may temporarily hold values or data generated by CPU 101 or by other components or operations, or may hold for example instructions that may be waiting to be executed by CPU 101. CPU 101 may include a control unit 130 that in some embodiments may for example control the flow of values or data to and from cache 114 or for example between registers 124. Any other suitable structure for a CPU may be used.

Figure 2:
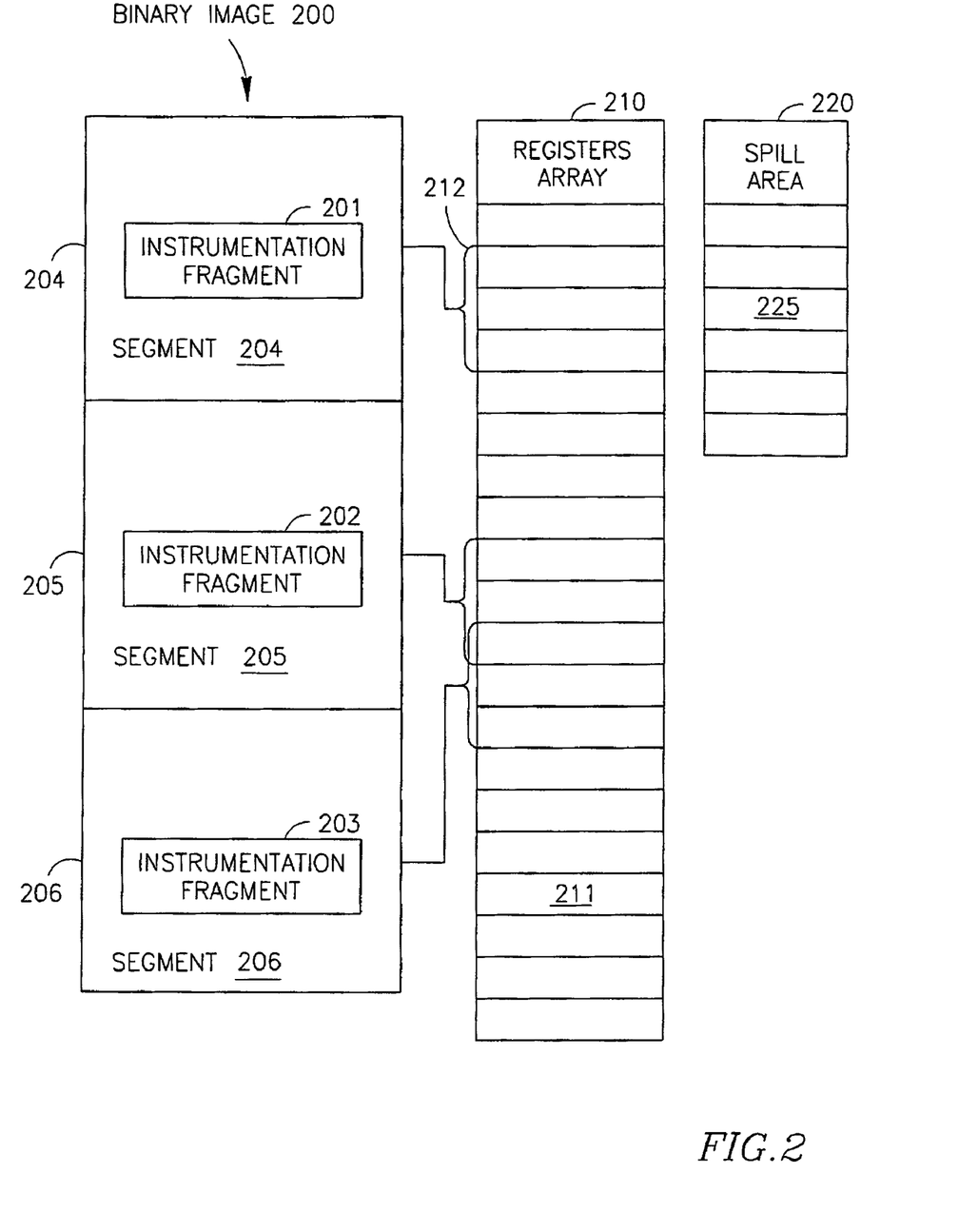
FIG. 2 is a schematic depiction of a binary image, a spill array and a register storage space in accordance with an embodiment of the invention.

Reference is made to FIG. 2, a schematic depiction of a binary image, a spill array and a register storage space in accordance with an embodiment of the invention. In some embodiments of the invention a compiled binary image 200 may be opened, analyzed and changed. The binary image 200 may be analyzed and changed during, for example, binary instrumentation. A program code and/or an instrumentation fragment may use register array 210 that may be or include registers 211. Some of registers 211 may for purposes of a particular execution of a program code or instrumentation fragment be free registers 125 (FIG. 1B), which may not be in use at a particular place in a program, or that may hold a value that is not used or later called on in a program or instrumentation, while others may be busy registers 126 (FIG. 1B). Some of registers 211, for example registers 212, may be "not accessed" registers which may not be in use within a particular segment of the program or the instrumentation fragment, e.g., not being read from or written to. Not accessed registers 212 may have values that may be read after the execution leaves one region to enter another region. Thus these registers may not necessary be free within a region, where they are not accessed. In some embodiments of the invention there may be designated various data structures in an instrumentation or an instrumentation fragment that may be inserted into a binary image of a compiled program. In some embodiments such data structures may be designated as, for example, a spill array 220 which may include spill cells 225. Other designations may be used and such structures may be combined into one or more data structures or divided into a greater number of data structures. In some embodiments, spill array 220 may be designated in memory 102 (FIG. 1A) or in another data storage unit accessible to CPU 101 (FIG. 1A).

Binary image 200 may be a binary image of a program being instrumented. For example, binary image 200 may include instrumentation fragments 201, 202 and 203 which may be introduced within the original binary image at instrumentation locations. An instrumentation location may be a location within the instrumented program in which an instrumentation fragments may be inserted. Other numbers of fragments may be used. Instrumentation fragments may use registers to perform their tasks, and sufficient free registers may be provided to the instrumentation fragments.

Binary image 200 may be analyzed and partitioned into regions, segments or pieces of code, for example, segments 204, 205 and 206. Other numbers of segments may be used. In some embodiments each segment of binary image may include one or more instrumentation fragments. Each segment may be associated with for example N+1 registers or N+x registers which are not accessed within the region, where N may represent at least the maximum number of registers used within an instrumentation fragment in the instrumented program. For example, segment 204 may include or be associated with registers 212. Any other suitable number of registers may be used. The not accessed registers 212 may be floating point registers, signed registers, unsigned registers or any other suitable registers.

In some embodiments, register set or array 210 may be designated in memory 102 (FIG. 1) or in another data storage cell connected with CPU 101 (FIG. 1). In some embodiments, register set or array 210 may be configured in forms other than an array such as for example, a set, a tree, a table, a hash table or other data structures.

Spill array 220 may be or include one or more data storage areas or cells of memory wherein data may be inserted or spilled, such as for example data collected in registers 212 during an execution of an instrumentation fragment or the original program. In some embodiments data in busy registers 125 (FIG. 1) may be spilled into spill cell 225 before an instrumentation fragment is executed. In other embodiments, spill cells 225 may be used to store data collected from sources other than registers 212 such as memory 102, or from processes other than the execution of an instrumentation fragment. For example, a spill cell 225 may be used to temporarily store data generated during the execution of a thread. In some embodiments spill array 220 may be configured in forms other than an array, such as for example, a tree, a table, a hash table or other data structures.

Spill area 220 or portions of spill area 220 may be used for storing register values, for example, the execution may pass through a special instrumentation fragment, which uses a free register to allocate a spill area. The spilled area may be used for storing register values, for example, values of N+1 registers 212 (or N+x registers, where x is an integer) which are not accessed within segment 204. In some embodiments one or more of the spilled registers 212 may be used as a pointer to the spill area 220 or for other information. For example one or more registers may keep the address value of the spill cells being used.

The size or amount of memory designated for a spill cell 225 may in some embodiments depend on the type of software tool that is constructed by an instrumentation process. For example a coverage tool may impact a different number of registers than a thread checking tool, and the size of the spill cells 225 may be altered to accommodate such greater or smaller number of registers 212 to be spilled. Other factors may also impact the amount of memory that may be designated for each spill cell 225. Other designations, data formats or organization structures may be used.

In one embodiment of the invention, a spill cell 225 may be allocated for spilling the contents of registers 212 even though there is only a single free register available for use during the execution of an instrumentation fragment or a thread.

Figure 3:
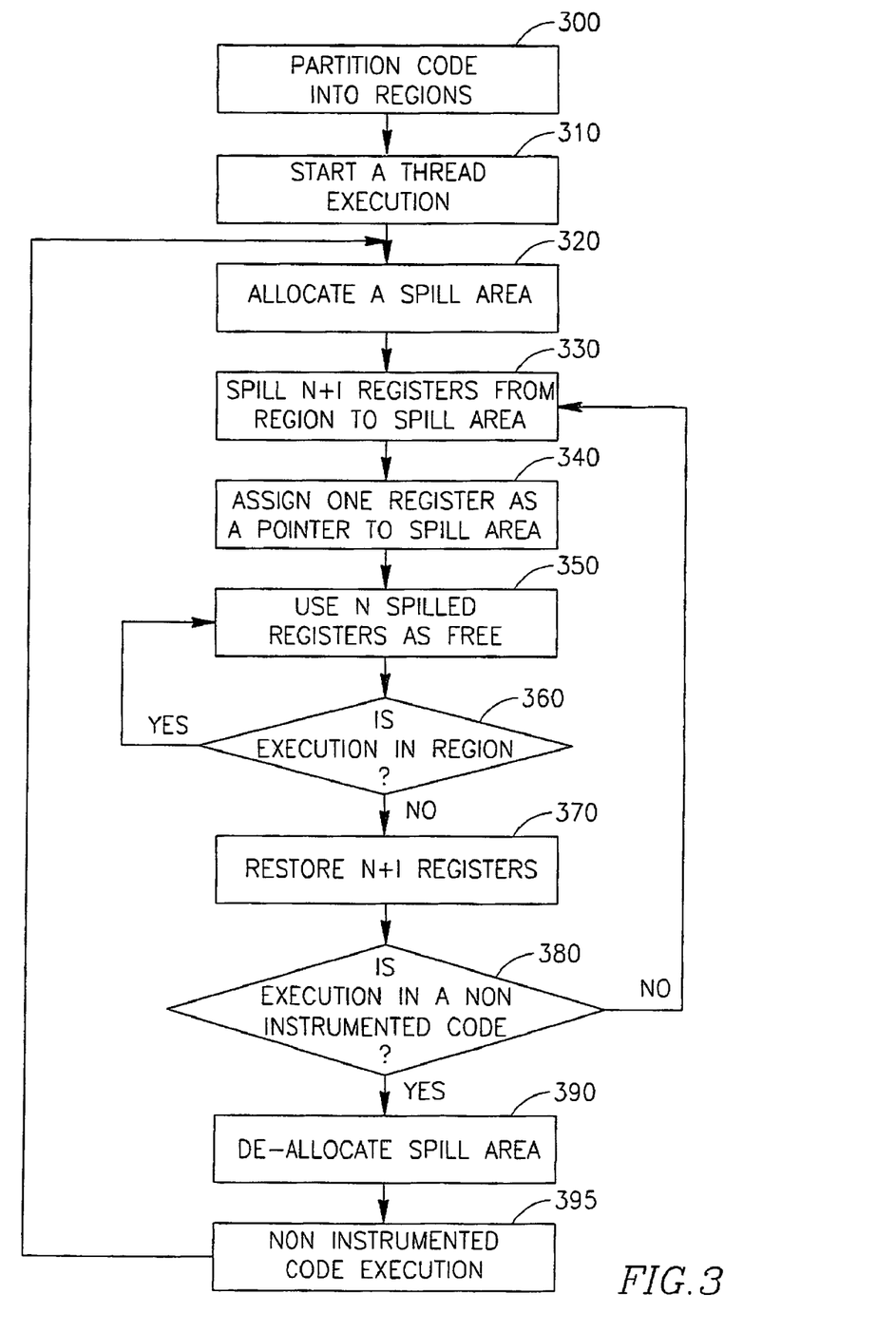
FIG. 3 is a schematic depiction of a method for maintaining a pre-defined number of free registers within an instrumented program in accordance with an embodiment of the invention.

Reference is made to FIG. 3, a schematic depiction of a method for maintaining a pre-defined number of free registers within an instrumented program in accordance with an embodiment of the invention.

In block 300, before instrumentation of a binary image is performed, the binary image may be partitioned into regions, portions or segments, such that for example, a pre-defined number of not accessed registers may be associated with each segment. The partitioning process may follow an analysis process of the binary image which may be performed when the information regarding the instrumentation fragments is supplied, for example, by an instrumentation tool. The information regarding the instrumentation fragments may include, for example, the number of instrumentation fragments, the location of each instrumentation fragment and number of registers needed for each instrumentation fragment. Other suitable partitioning processes may be used. In some embodiments of the invention the pre-defined number of not accessed registers which may be associated with each segment or region may be at least the maximum number of registers used within an instrumentation fragment in the instrumented program plus one. For example, each region may be associated with N+1 not accessed registers wherein N indicates the maximum number of registers used within an instrumentation fragment. According to some embodiments of the invention the values of N for an instrumentation fragment may be relatively low so that the regions in the code partition may be relatively large.

The not accessed registers associated with each segment or region may be for example floating point registers, signed registers, or unsigned registers. Any other suitable kind of registers may be used. In some embodiments the registers which are not accessed within a certain region may have live values, which may be values that may be read after the execution leaves the certain region or segment so that these registers are not free within the region where they are not accessed.

In block 310 a thread of execution is started. The thread may start from, for example, a start point, an entry point or an init function, or another suitable point. In some embodiments, for example, when the program is running on a processor with register stack architecture, a data flow analysis may be applied to the function in order to verify whether there is at least one free register in the current region. The thread of execution may start from an entry point such as an init function, which may include an instruction which may be used or changed to get a free register, for example, alloc instruction. Other functions may be used.

In block 320, before execution of the current region is started a spill area may be allocated. The spill array may be or include one or more data storage areas or cells of memory wherein can be inserted or spilled data, such as for example data collected in a register 124 during an execution of an instrumentation fragment, original program or a thread. In some embodiments the spill array may be configured in forms other than an array, such as for example, a tree, a table, a hash table or other data structures. The spill area may be allocated in various methods. For example, in processors with a register stack architecture at least one free register may be needed in order to allocate a spill area. In some embodiments, in case no free registers are found in the current region, an instruction, for example, an alloc instruction or other suitable function or instruction may be changed in order to increase the number of output registers by one. This additional output register may be used as free register associated with the specific location. In the region that may correspond to the location of the free register, the execution may pass through a special instrumentation fragment, which may use the free register to allocate a spill area for a pre-defined number of registers, for example, N+1 registers which are not accessed in this specific region or code segment. The spill area allocation may be performed as described in FIG. 3 and FIG. 4 below or in any other suitable method. Other methods for memory allocation may be used for other processor architectures.

In block 330 the content of a pre-defined number of registers, for example, N+1 registers, which are not accessed in the specific region, may be spilled into the spill area which was allocated in block 320. The content of such registers, for example, data collected in the registers during an execution of an instrumentation fragment or temporarily store data generated during the execution of a thread, may be spilled into the spill area The registers being spilled may be floating point registers, signed registers, unsigned registers or any other registers.

In block 340 one or more of the spilled registers may be assigned to be the pointer to the spilled area, e.g., one or more of the spilled registers may keep the address, index or other indication of the allocated spill area location. Although the scope of the present invention is not limited in this respect, in some embodiments N+1 not accessed registers within a certain region are spilled to the spilled area. N may indicate the maximum number of registers used in an instrumentation fragment in the instrumented program while the additional register or registers may be assigned the pointer to the spill area location. In some embodiments where an alloc or other instruction has been changed in order to allow a free register associated with a specific location, an original alloc or other instruction may be performed, for example, at the end of an instrumentation fragment, in order to de-allocate the freed register. The registers may be maintained, for example, while executing in the current region.

In block 350 the pre-defined number of registers which were spilled as described in block 330 may be used or maintained as free registers within the region or code segment. In some embodiments the number of registers which may be used as free registers includes the pre-defined number of registers minus one register (which, for example, may be used as a pointer to the spill area as described in block 340), for example N registers may be used as free registers within the region or code segment. The thread may use the spilled registers as free as long as the execution stays within the current region. The free spilled registers may be used, for example to collect data during an execution of an instrumentation fragment, to temporarily store data generated during the execution of a thread or instrumentation fragment or for any other purposes.

In block 360 a determination may be made as to whether the execution is still in the current region or code segment. If the execution is in the current region further use of the free registers may be made as described in block 350. In case the execution is about to leave the current region, e.g., code and instrumentation fragments execution is completed or nearly completed within the current region, an embodiment of the method may proceed to block 370.

In block 370, when the execution is about to leave to another region or code segment, prior to leaving the current region the values or content of the spilled registers, stored in the spill area may be restored to their original locations. After the register values are restored the execution may move to another region or code segment.

In block 380 a determination may be made as to whether the execution is in non-instrumented code, for example, a system library or the like. If the execution is in instrumented code the method may return to block 330, and another pre-defined number of register values, for example, N+1 registers which are not accessed within the next region, may be spilled into the spilled area (which was previously allocated in block 320), and while the execution stays within this region the thread may use, for example, N registers as free registers as described in blocks 340 and 350. An embodiment of method may maintain the pre-defined number of free registers during execution of the program, such that at each point during execution, each segment of the program may have access to at least the pre-defined number of free registers. If the execution is in non-instrumented code or if the thread is about to cease a transfer may be made to block 390.

In block 390 the spill area may be de-allocated, e.g., placed back in the pool of free memory cells. In some embodiments after de-allocation of the spill area is made the execution may reenter the instrumented code or may enter a non instrumented code.

In block 395 the execution may be in a non instrumented code area. In some embodiments after de-allocation of the spill area is made the execution may be in a non instrumented code and a transfer may be made to block 320. As indicated in block 320, a new spill area may be allocated and the registers which are not accessed in the region being entered may be spilled into the spill area.

Other operations or series of operations may be used.

Figure 4:
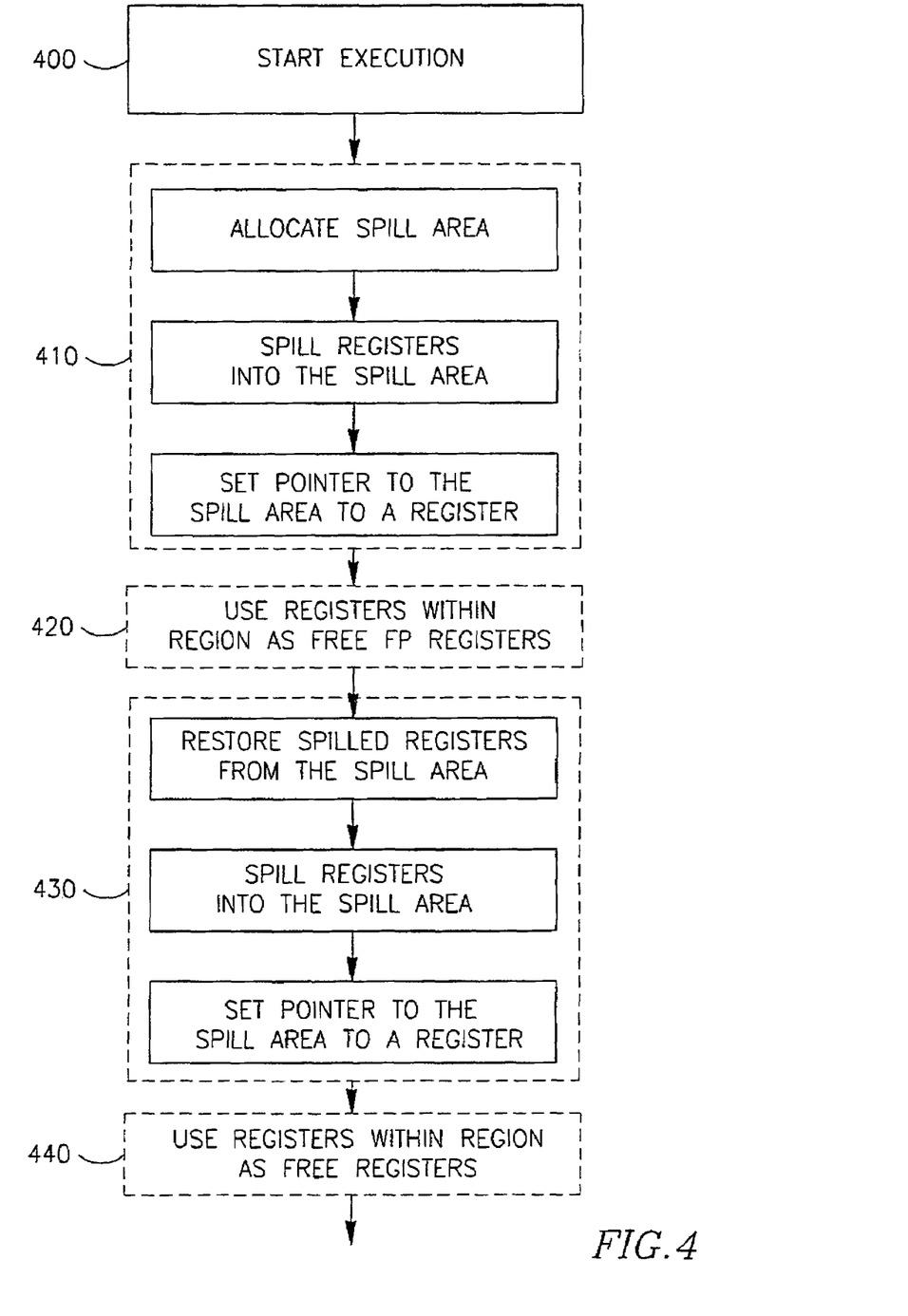
FIG. 4 is a schematic depiction of a method for maintaining free registers within an instrumented program in accordance with an embodiment of the invention.

Reference is made to FIG. 4, a schematic depiction of a method for maintaining two free registers within an instrumented program in accordance with an embodiment of the invention. FIG. 4. represents a series of operations of one embodiment with a specific data set; other data sets may be used.

FIG. 4 refers to two regions (termed for example R0 and R1) which may be previously partitioned as described in, for example FIG. 3, other partition methods may be used. In region R0 a set of registers (termed for example FP3, FP4 and FP5) are not accessed within the region while in region R1 a set of registers (termed for example FP7, FP8 and FP9) are not accessed. In other embodiments, or other data configurations, other registers and regions may be accessed.

In block 400 the execution is started and prior to the entrance to the first region R0 an initial instrumentation fragment may be executed.

In block 410 an initial instrumentation fragment is executed, a spill area is allocated for the current thread in a thread safe manner, and the values of FP3, FP4 and FP5 are spilled into the spill area as, for example, described in FIG. 3. The instrumentation fragment may set the pointer to the spill area to one of the spilled registers, for example, to FP3.

In block 420 the execution may enter region R0 and may use, for example, registers FP4 and FP5 as free registers. The free FP4 and FP5 registers may be used, for example to collect data during an execution of an instrumentation fragment, to temporarily store data generated during the execution of a thread or instrumentation fragment or for any other suitable purposes. Other numbers of registers may be used.

In block 430, before the execution is about to transfer to the next region R1, a cross-region instrumentation fragment may be executed which may restore the values of FP3, FP4 and FP5 from the spill area, may store the values of FP7, FP8 and FP9 into the spill area and may set the pointer to the spill area into FP7.

In block 440 the execution may enter region R1 and may use registers FP8 and FP9 as free registers. The free FP8 and FP9 registers may be used, for example to collect data during an execution of an instrumentation fragment, to temporarily store data generated during the execution of a thread or instrumentation fragment or for any other purposes.

Any suitable number of regions, registers and instrumentation fragments may be used.

According to some embodiments of the invention a spill area may be allocated. For example, spill area allocation may be performed as described with respect to FIG. 5 and FIG. 6. Any other suitable allocation method may be used.

Figure 5:
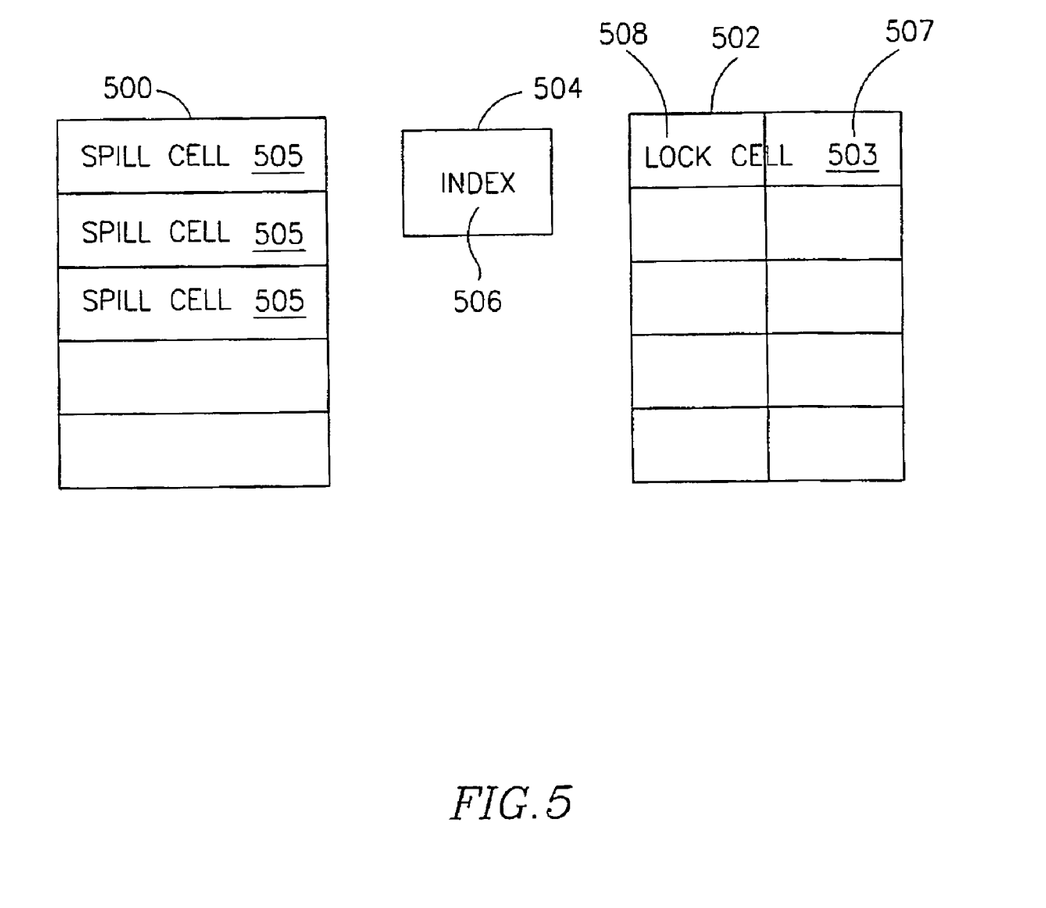
FIG. 5 is a schematic depiction of a lock array, a spill array and an index storage space in accordance with an embodiment of the invention.

Reference is made to FIG. 5, a schematic depiction of a lock array, a spill array and an index variable space in accordance with an exemplary embodiment of the invention. In some embodiments of the invention there may be designated various data structures that may be inserted into a binary image of a compiled program during an instrumentation in order to be used as spill areas. In some embodiments such data structures may be designated, respectively as a spill array 500, a lock array 502 and an index variable element 504. Other designations may be used and such structures may be combined into one or more data structures or divided into a greater number of data structures.

In some embodiments, spill array 500 may be designated in a memory such as memory 102 (FIG. 1A) or in another data storage unit accessible to a processor such as CPU 101 (FIG. 1A). Spill array 500 may be or include one or more data storage areas or cells of memory wherein can be inserted or spilled data, such as for example data collected in a register 124 (FIG. 1B) during an execution of an instrumentation fragment or the original code. In some embodiments data in busy registers 125 (FIG. 1B) may be spilled into a spill cell 505 before an instrumentation fragment is run. In other embodiments, spill cells 505 may be used to store data collected from sources other than registers 124 (FIG. 1B) such as memory 102 (FIG. 1A), or from processes other than the execution of an instrumentation fragment. For example, a spill cell 505 may be used to temporarily store data generated during the execution of a thread. In some embodiments spill array 500 may be configured in forms other than an array, such as for example, a tree, a table, a hash table or other data structures.

In some embodiments, one or more spill cells 505 of spill array 500 may be indexed, by way of, for example, ascending numbers, such that each spill cell 505 of spill array 500 may be indexed by a unique number. In some embodiments index 506 may begin at zero and ascend to the number of spill cells 505 in spill array 500 minus 1. The number of spill cells 505 in spill array 500 may be designated to match the number of threads or expected number of threads, or expected maximum number of threads, that may be encountered in an execution of a binary code. In some embodiments, the number of spill cells 505 may be unrelated to the number of threads of a program. In order to avoid having all cells of a spill array 500 allocated at once, in some embodiments the number of spill cells 505 in a spill array 500 may exceed the number of threads that may be executed concurrently during an instrumentation fragment. In the event that all cells are allocated at once, a new thread that attempts to allocate a spill cell 505 may wait in a busy loop until one of the threads releases a spill cell 505.

In some embodiments, the number of spill cells 505 in a spill array 500 is equal to the number of cells in a lock array 502. In some embodiments, the number of cells in a lock array 502 and spill array 500 may be fixed when an instrumentation process is initiated.

The size or amount of memory designated for a spill cell 505 may in some embodiments depend on the type of software tool that is constructed by an instrumentation process. For example a coverage tool may impact a different number of registers than a thread checking tool, and the size of the spill cells 505 may be altered to accommodate such greater or smaller number of registers 124 (FIG. 1B) to be spilled. Other factors may also impact the amount of memory that may be designated for each spill cell 505.

In some embodiments, lock array 502 may be designated in memory 102 (FIG. 1A) or in another data storage cell connected with CPU 101 (FIG. 1A). Lock array 502 may be configured in forms other than an array such as for example, a tree, a table, a hash table or other data structures. Lock cells 503 of lock array 502 may be indexed by index 506, such that the index 506 number of a first spill cell 505 of spill array 500 has the same index 506 number as the first lock cell 503 of lock array 502. The index 506 numbers of the second, third and further cells are likewise the same for lock cells 503 or spill cells 505. An address in a memory, such as for example memory 102 (FIG. 1A), of a first lock cell 503 of a lock array 502 may be inserted into an instrumentation fragment when the lock array 502 is designated in a memory such as for example memory 102 (FIG. 1A).

In some embodiments, lock cells 503 of lock array 502 may be divided into two or more fields to store two or more values. The first value, which in some embodiments may be stored in the more significant positions 508 of lock cell 503, may be or include the index 506 number of the lock cell 503, which may for example correspond to the position of lock cell 503 in the lock array 502. The second value, which may in some embodiments be stored in the less significant positions 507 of lock cell 503, may store integers or other values which may be designated as lock cell values. Other designations, data formats or organization structures may be used.

Index variable element 504 may in some embodiments be a designated space in memory 102 (FIG. 1A) or other memory location which may in some embodiments store index 506. The address of index variable element 504 may be moved into a free register 126 as is described in FIG. 1B using for example a move long immediate (movl) instruction or other suitable instructions as may store an address in a register 124 (FIG. 1B). In some embodiments, similar instructions may be employed when further access is made to index variable element 504. In some embodiments, index 506 may be assigned an initial value of zero during an instrumentation process or at the beginning of a program. Index 506 may be incremented as access is made to further cells in lock array 502 or spill array 500. Other values for index 506 may be used.

In one embodiment of the invention, a spill cell 505 may be allocated for spilling the contents of busy registers 125 (FIG. 1B) even though there is only a single free register 126 (FIG. 1B) available for use during the execution of an instrumentation fragment or a thread.

Figure 6:
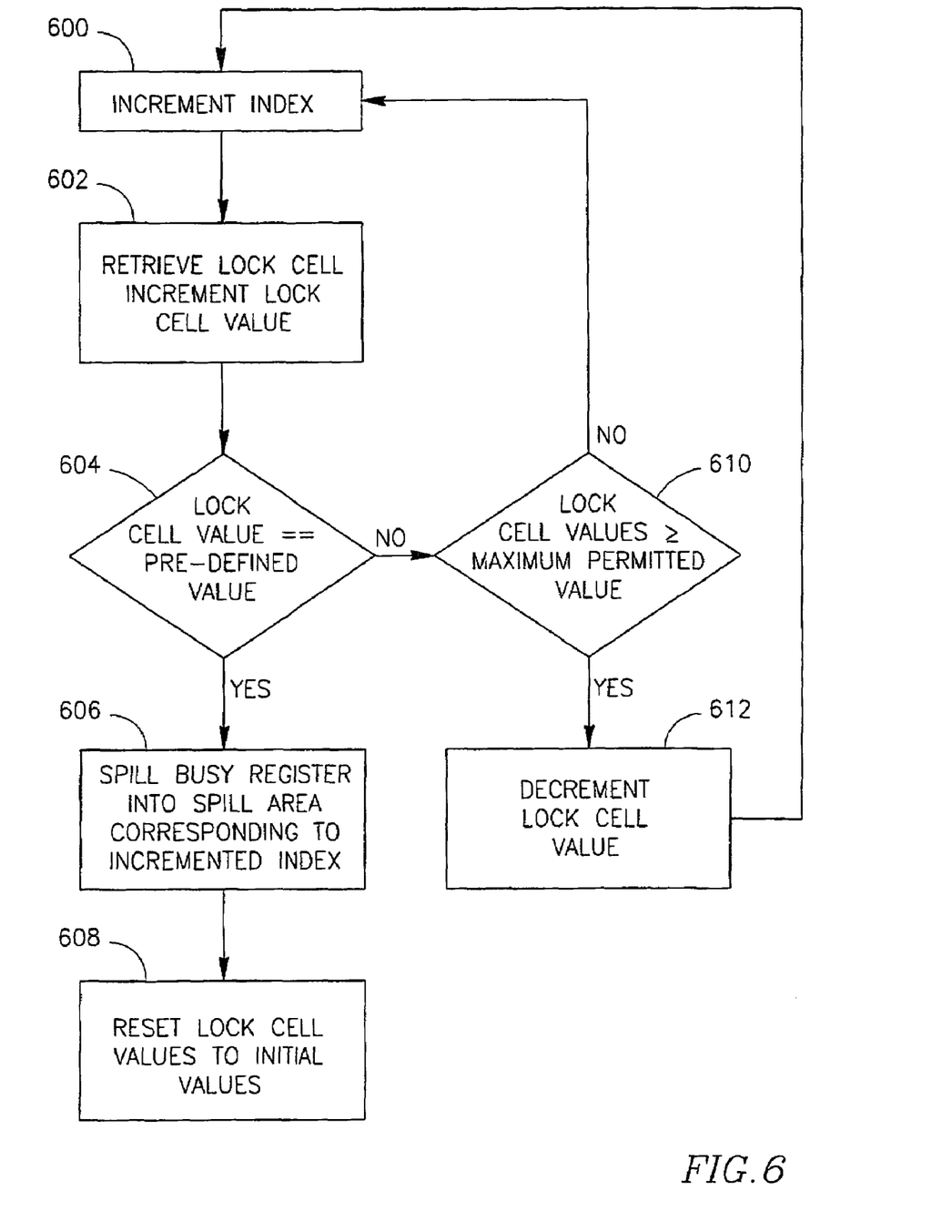
FIG. 6 is a flow chart depicting a method for allocating a spill cell of a spill array in accordance with an embodiment of the invention.

Reference is made to FIG. 6, a flow chart depicting certain operations for allocating spill area in accordance with an exemplary embodiment of the invention. Other suitable methods of allocating or using a spill area may be used. In some embodiments, a free register such as register 126 (FIG. 1B) may be found or designated as part of the preparation of the execution of a binary instrumentation fragment or thread. In some embodiments of the invention, an address of, for example index variable element 504 (FIG. 5) may be read into a free register 126 (FIG. 1B) using for example a movl instruction or other suitable instruction. In block 600, index 506 (FIG. 5) or another index may be incremented, using, for example a fetchadd instruction or another threadsafe process, and the incremented index 506 (FIG. 5) may be stored both in index variable element 504 (FIG. 5) and in free register 126 (FIG. 1B). As described below, a series of instructions may calculate the address of the lock cell 503 (FIG. 5) that corresponds to the incremented index 506 (FIG. 5), using a single free register 126 (FIG. 1B). In other embodiments, other methods may be used for calculating an address of a lock cell 503 (FIG. 5) in a lock array 502 (FIG. 5).

In block 602, a further fetchadd, or another threadsafe instruction, may retrieve both the index 506 (FIG. 5) value as is stored in the most significant positions 508 (FIG. 5) of lock cell 503 (FIG. 5), and the lock cell value as is stored in the least significant positions 507 (FIG. 5) of lock cell 503 (FIG. 5). As a result, the incremented lock cell value may be stored both in free register 126 (FIG. 1B) and in lock cell 503 (FIG. 5). In one embodiment, the incrementing of lock cell value may effect only the least significant positions 507 (FIG. 5) of the retrieved lock cell 503 (FIG. 5) such that while the lock cell value is incremented, the index value of such lock cell 503 (FIG. 5) remains unchanged.

In block 604, a comparison is made of the incremented lock cell value of the lock cell 503 (FIG. 5) as it was read into free register 126 (FIG. 1B), and a pre-defined value, such as for example 1. If the incremented lock cell value equals the pre-defined value, the method may continue in block 606. If the incremented value does not equal a pre-defined value, execution may continue in block 610.

If the incremented lock cell value equals a pre-defined value, it indicates that the lock cell 503 (FIG. 5) corresponding to the incremented index 506 (FIG. 5) was available and has now been successfully allocated for use by, for example, the current thread, and has not yet been taken by a previous thread, fragment or other use. For example, if a lock cell value is 1 (indicating that it was zero before it was incremented by for example a fetchadd as may have been used in the process of block 600), it indicates that the lock cell 503 (FIG. 5) was available and has now been allocated by the current instruction. Because lock array 502 (FIG. 5) and spill array 500 (FIG. 5) share index 506 (FIG. 5), a successful allocation of a lock cell 503 (FIG. 5) may indicate that the spill cell 505 (FIG. 5) with the same index 506 (FIG. 5) as the lock cell 503 (FIG. 5) may be available, and may been allocated to accept data to be spilled from busy registers 125 (FIG. 1B).

At the end of the execution of an instrumentation fragment by a thread or at other intervals, the data that had been spilled into spill cell 505 (FIG. 5) may replaced back into the busy registers 125 (FIG. 1B) from which such data may have been spilled.

In block 608, a threadsafe instruction, such as for example an ordered store instruction or a fetchadd instruction, may decrement or otherwise reset lock cell value to an initial value such as for example zero. The reset or re-initialized lock cell value may indicate that the lock cell 503 (FIG. 5) and its corresponding spill cell 505 (FIG. 5) may be available again for allocation.

In some embodiments, a predicate register or other suitable storage device or method may be used to compare an incremented lock cell value to a pre-defined value as was described in block 604 above. Because in one example it may be assumed that all predicate registers are busy, a predicate register may be freed prior to, or as part of, the process of performing such comparison. In some embodiments freeing a busy predicate register may entail reading and storing a single bit that may have been held in the predicate register, and restoring the bit once the desired comparison has been completed Other numbers of bits may be used. In some embodiments, a bit from a predicate register may be held in a bit position that is left unallocated in for example, the index 506 (FIG. 5) field of a lock cell 503 (FIG. 5). In some embodiments, such unallocated bit position may be the most significant position in lock cell 503 (FIG. 5). As lock cell 503 (FIG. 5) is read into free register 126 (FIG. 1B), free register 126 (FIG. 1B) may likewise have a bit position that is unallocated or unused by either the index 506 (FIG. 5) field or the lock cell value field. In some embodiments, prior to the execution of a comparison, an instruction such as for example a shift right pair (SRP) instruction may move all of the allocated bits in free register 126 (FIG. 1B) one position to the left such that the unallocated bit position in such free register 126 (FIG. 1B) is moved to the least significant position. Freeing the least significant position in free register 126 (FIG. 1B) may in some embodiments permit an instruction such as for example a conditional add instruction to read and store the value in a predicate register into, and subsequently out of, the least significant position in free register 126 (FIG. 1B). Other suitable methods of achieving such read and store or such freeing a busy predicate register may be used.

In block 606, a spill of busy registers 125 (FIG. 1B) may be performed into allocated spill cell 505 (FIG. 5) that corresponds to the incremented index 506 (FIG. 5). In some embodiments, the pre-defined value to which a lock cell value may be compared may be set to 1, and the lock cell value may be initially set to 0. By doing so, the fetchadd increments the lock cell value from 0 to 1, and the allocation of the lock cell 503 (FIG. 5) as is determined by the comparison of the lock cell value to the pre-defined value may be deemed successful since the lock cell value matches the pre-defined value which may be 1. If the fetchadd instruction increments the lock cell value to greater than a pre-defined value such as 1, the allocation may be considered to be unsuccessful, indicating that the lock cell 503 (FIG. 5) and the corresponding spill cell 505 (FIG. 5) have already been allocated to a prior thread or to a prior instrumentation fragment. In some embodiments the predetermined value may be set to sums other than 1. In some embodiments, the pre-defined value may be stored in an instrumentation fragment. Other systems of notation and meaning may be used, and thus the specific values discussed herein may in other embodiments be different.

Returning to block 604, if the incremented lock cell value is not equal to the pre-defined value, an embodiment of the method may proceed to block 610. In block 610 a determination is made as to whether the lock cell value has been incremented so many times that it may overflow its allocated memory, and potentially compromise the index field of the lock cell-503 (FIG. 5), or otherwise interfere with the process described above. To determine whether there is such a risk, the process in block 610 compares the lock cell value to a maximum permitted value. If it is determined that the lock cell value is not overflowing the memory allocated to lock cell value, an embodiment of the method proceeds to block 600. If it is determined that lock cell value is, or is close to, overflowing the memory allocated to the lock cell value, an embodiment of the method proceeds to block 612.

A maximum permitted value may in some embodiments be set at for example $2^i$–Max#T (or at a value that is a function thereof), where i is the number of bits in lock cell 503 that may be used for storing a lock cell value, and MAX#T is the maximum number of threads that may run concurrently during the instrumentation fragment. Other quantities or methods of calculating maximum permitted values may be used. In block 612 a lock cell value may be reduced or decremented to a value that is above the pre-defined value to which lock cell value was compared in block 604.

In block 612, the lock cell value may be reduced or decremented to for example 2 or some other value that is greater than the pre-defined value to which lock cell value was compared in block 604, but less than the maximum permitted value. Other methods may be used to prevent a lock cell value from overflowing the memory allocated to it. For example, as a result of prior fetchadd instructions, a lock cell value may have been incremented several times. In some embodiments, an overflow check of the lock cell value may be made after it is incremented to determine if the lock cell value is greater than or equal to the maximum permitted value. In some embodiments, an overflow check as described above may be performed each time a lock cell value is incremented. In other embodiments, such a check may be performed periodically or at certain intervals in the course of the execution of an instrumentation fragment. In some embodiments, a lock cell value may be reduced, decremented or reset by a threadsafe instruction such as for example a fetchadd or ordered store instruction.

In some embodiments, a comparison of an incremented lock cell value to a maximum permitted value may be performed using a predicate register. Such a predicate register may be freed through a process similar to that described above with respect to block 604 in the comparison of a lock cell value to a pre-defined value.

To avoid incrementing index 506 (FIG. 5) beyond the number of cells in the lock array 502 (FIG. 5), in some embodiments an instruction may reduce index 506 (FIG. 5) modulo to the number of the cells in lock array 500 (FIG. 5), e.g., dividing the incremented index 506 (FIG. 5) by the number of cells in the lock array 502 (FIG. 5) and returning the remainder. Reducing index 506 (FIG. 5) by the number of cells in lock array 502 (FIG. 5) may in some embodiments wrap the incremented index 506 (FIG. 5) back into the cells of the lock array 502 (FIG. 5) where it would otherwise have exceeded the number of cells in the lock array 502 (FIG. 5). Such a wrap may facilitate finding lock cells 503 (FIG. 5) or spill cells 505 (FIG. 5) that have been freed and are again available for allocation. In some embodiments where the number of cells in a spill array 500 (FIG. 5) is chosen as a power of two, such as for example $2^i$, a reduction or modulo as described above may be accomplished by extracting the least significant bits of index 506 (FIG. 5). For example, if a length of a spill array 500 (FIG. 5) or lock array 502 (FIG. 5) is $2^i$, and an index 506 (FIG. 5) after an increment equals j, a wrap may be accomplished by extracting the i lower bits of j. Such an extraction may be performed each time index 506 (FIG. 5) is incremented or with other periodicity.

In some embodiments, exceptions may occur during the execution of an instruction. Some of these exceptions may be deferred rather than generating a fault. Where a register 124 (FIG. 1B) is the target of the instruction which caused the exception, a designated bit that may be associated with such register 124 (FIG. 1B) may be set to for example 1 to indicate the deferral of the exception. Such bit may be referred to as, for example, a NaT bit. A set NaT bit may in some embodiments be used for example later in a process to detect a deferred exception that may have occurred. In some embodiments a register 124 (FIG. 1B), which may for example be referred to, for example, as a user NaT collection register (UNAT), may be designated to collect NaT bits of other registers 124 (FIG. 1B) that have been spilled. In some embodiments of the present invention, when a register 124 (FIG. 1B) that has an associated NaT bit, is spilled, the data of such spilled register may be passed through a floating point register to prevent the corruption of the content of the UNAT register.

In some embodiments, it may be necessary to calculate from index 506 (FIG. 5) the address of a lock cell 503 (FIG. 5) as such lock cell 503 (FIG. 5) may be stored in a memory, such as for example memory 102 (FIG. 1A). To calculate such address when only a single free register 126 (FIG. 1B) is available, one or more instructions or series of instructions may be used. The result of such instructions may in some embodiments be the addition of the offset of index 506 (FIG. 5) corresponding to the $j^{th}$ lock cell 503 (FIG. 5) to the address of the first lock cell 503 (FIG. 5) in the lock array 502 (FIG. 5). For example, as described in block 600 an incremented index 506 (FIG. 5) may be calculated into an offset, and read into free register 126 (FIG. 1B), such that free register 126 stores a value equal to the offset of the index of $j^{th}$ lock cell 503 (FIG. 5). Such offset value may initially occupy the least significant positions of free register 126 (FIG. 1B). The address of the first lock cell 503 (FIG. 5) in the lock array 502, which may in some embodiments be a unique value, such as a 64 bit value, may be divided into for example three or more address parts of 21 or 22 bits each. Other sizes and number of parts may be used. The least significant, or first address part, of such three parts may be added to the offset value as is stored in the free register 126 (FIG. 1B) by way of a threadsafe instruction such as for example an addl. A further instruction such as for example, a shift right pair instruction may cyclically move the sum of the offset value plus the first address part to the most significant positions of free register 126 (FIG. 1B). A middle address part of such three address parts may then be added to free register 126 (FIG. 1B) by way of for example a further addl instruction, and a further shift right pair instruction may cyclically move such middle address part over to the most significant positions of free register 126 (FIG. 1B). The most significant, or third address part may be added to free register 126 (FIG. 1B) by way of for example an addl, and a further shift right pair instruction may cyclically move such third address part to the most significant positions of free register 126 (FIG. 1B). The result of such instructions may be that free register 126 (FIG. 1B) stores the address of the $j^{th}$ lock cell 503 (FIG. 5) which was derived by adding the address of the first lock cell 503 (FIG. 5) in lock array 502 (FIG. 5) to the offset of the index 506 (FIG. 5) of the $j^{th}$ lock cell 503 (FIG. 5). Other methods of calculating the address of a $j^{th}$ lock cell 503 from index 506 (FIG. 5) may also be used.

In some embodiments, an instrumentation fragment may include a structure such as a self-modifying code that may modify each of the three address parts described above to compensate for differences, if any, between the preferred base address of an image, on the one hand, and the actual base address as is assigned by the loader, on the other hand. Such self-modifying code may be executed before the process described above. Other suitable methods of modifying the addresses to compensate for differences between actual and preferred base addresses may be used.

It will be appreciated by persons skilled in the art that embodiments of the invention are not limited by what has been particularly shown and described hereinabove. Rather the scope of at least one embodiment of the invention is defined by the claims below.

What is claimed is:

1. A method comprising:
   executing an instrumented software program having a plurality of segments;
   maintaining a pre-defined number of free registers during execution of the instrumented software program, such that at each point during execution of a segment, the segment has access to at least the pre-defined number of free registers;
   partitioning the instrumented software program into regions, wherein each region is associated with a pre-defined number of not accessed registers, and wherein the pre-defined number of not accessed registers is a maximum number of registers used by an instrumentation fragment plus one;
   allocating a spill area for a pre-defined number of registers per thread of execution while first entering a region;
   spilling the registers associated with the region into the spill area, wherein spilling the registers comprises storing register values in the spill area;
   using the spilled registers as free registers while execution is in the region, wherein using the spilled registers comprising using one or more of the spilled registers as a pointer to the spill area;
   restoring the register values of the pre-defined number of registers when execution passes from the region; and
   de-allocating the spill area when execution reaches a non instrumented code.

2. The method of claim 1, wherein allocating the spill area comprises using a free register.

3. The method of claim 1, wherein the spill area comprises memory cells.

4. A system comprising a processor to:
   execute an instrumented software program having a plurality of segments;
   maintain a pre-defined number of free registers during execution of the instrumented software program, such that at each point during execution of a segment, the segment has access to at least the pre-defined number of free registers;
   partition the instrumented software program into regions, wherein each region is associated with a pre-defined number of not accessed registers, and wherein the pre-defined number of not accessed registers is a maximum number of registers used by an instrumentation fragment plus one;
   allocate a spill area for a pre-defined number of registers per thread of execution while first entering a region;
   spill registers associated with the region into the spill area, wherein spilling the registers comprises storing register values in the spill area;
   use the spilled registers as free registers while execution is in the region, wherein using the spilled registers comprises using one of the spilled register as a pointer to the spill area;
   restore the register values of the pre-defined number of registers when execution passes from the region; and
   de-allocate the spill area when execution reaches a non instrumented code.

5. The system of claim 4, wherein allocating the spill area comprises using a free register.

6. The system of claim 4, wherein the spill area comprises memory cells.

7. A data storage medium comprising instructions that when executed, cause a processor to:
   execute an instrumented software program having a plurality of segments;
   maintain a pre-defined number of free registers during execution of the instrumented software program, such that at each point during execution of a segment, the segment has access to at least the pre-defined number of free registers;
   partition the instrumented software program into regions, wherein each region is associated with a pre-defined number of not accessed registers, and wherein the pre-defined number of not accessed registers is a maximum number of registers used by an instrumentation fragment plus one;
   allocate a spill area for a pre-defined number of registers per thread of execution while first entering a region;
   spill registers associated with the region into the spill area, wherein spilling the registers comprises storing register values in the spill area;
   use the spilled registers as free registers while execution is in the region, wherein using the spilled registers comprises using one of the spilled register as a pointer to the spill area;
   restore the register values of the pre-defined number of registers when execution passes from the region; and de-allocate the spill area when execution reaches a non instrumented code.

8. The data storage medium of claim 7, wherein the instructions cause the processor to: allocating the spill area comprises using a free register.

9. The data storage medium of claim 7, wherein the spill area comprises memory cells.

* * * * *